(12) United States Patent
Yin

(10) Patent No.: US 10,562,487 B2
(45) Date of Patent: Feb. 18, 2020

(54) THREE-POINT SAFETY BELT AND VEHICLE HAVING SAME

(71) Applicants: Zhejiang Geely Automobile Research Institute Co., Ltd., Linhai, Zhejiang Province (CN); Zhejiang Geely Holding Group Co., Ltd., Hangzhou, Zhejiang Province (CN)

(72) Inventor: Gaoji Yin, Linhai (CN)

(73) Assignees: ZHEJIANG GEELY AUTOMOBILE RESEARCH INSTITUTE CO., LTD., Linhai, Zhejiang Province (CN); ZHEJIANG GEELY HOLDING GROUP CO., LTD., Hangzhou, Zhejiang Province (CN)

( * ) Notice: Subject to any disclaimer, the term of this patent is extended or adjusted under 35 U.S.C. 154(b) by 81 days.

(21) Appl. No.: 15/745,124

(22) PCT Filed: Jun. 7, 2016

(86) PCT No.: PCT/CN2016/085068
§ 371 (c)(1),
(2) Date: Jan. 15, 2018

(87) PCT Pub. No.: WO2017/016320
PCT Pub. Date: Feb. 2, 2017

(65) Prior Publication Data
US 2018/0208152 A1 Jul. 26, 2018

(30) Foreign Application Priority Data

Jul. 29, 2015 (CN) .......................... 2015 1 0455593

(51) Int. Cl.
*B60R 22/34* (2006.01)
*B60R 22/02* (2006.01)
*B65H 75/44* (2006.01)

(52) U.S. Cl.
CPC ............ *B60R 22/34* (2013.01); *B60R 22/023* (2013.01); *B65H 75/4439* (2013.01); *B60R 2022/029* (2013.01); *B60R 2022/3402* (2013.01)

(58) Field of Classification Search
CPC ............ B60R 2022/3424; B60R 22/34; B60R 2022/029
See application file for complete search history.

(56) References Cited

U.S. PATENT DOCUMENTS 3,549,203 A * 12/1970 Rawson .................. B60R 22/34
24/572.1
4,065,156 A * 12/1977 Tanaka .................. B60R 22/023
280/807
(Continued)

FOREIGN PATENT DOCUMENTS

CN 1923578 A 3/2007
CN 104002759 A 8/2014
(Continued)

*Primary Examiner* — Nicole T Verley
(74) *Attorney, Agent, or Firm* — Cheng-Ju Chiang

(57) ABSTRACT

A three-point safety belt includes a belt body, a winder, a shoulder belt guide ring, and a lock tongue. The winder and the shoulder belt guide ring are fixed onto a vehicle body. The winder is located below the shoulder belt guide ring. The lock tongue is disposed on the belt body. The lock tongue divides the belt body into a shoulder belt and a waist belt. The shoulder belt penetrates through the shoulder belt guide ring. The free end, away from the lock tongue, of the shoulder belt and the free end, away from the lock tongue, of the waist belt are both wound in the winder. The winder synchronously winds or unwinds the shoulder belt and the waist belt.

11 Claims, 4 Drawing Sheets

(56) References Cited

U.S. PATENT DOCUMENTS

| | | | |
|---|---|---|---|
| 4,099,684 A | | 7/1978 | Mori et al. |
| 4,101,170 A | | 7/1978 | Mori et al. |
| 4,113,280 A | | 9/1978 | Arai et al. |
| 4,116,402 A | * | 9/1978 | Nomura .................. B60R 22/34 242/377 |
| 4,130,253 A | | 12/1978 | Yasumatsu |
| 4,130,255 A | * | 12/1978 | Sasaki ..................... B60R 22/34 242/378.1 |
| 4,176,808 A | * | 12/1979 | Sasaki ..................... B60R 22/34 242/378 |
| 4,223,917 A | * | 9/1980 | Mori ..................... B60R 22/023 280/806 |
| 4,310,176 A | * | 1/1982 | Furusawa ............... B60R 22/42 242/381.4 |
| 4,646,987 A | * | 3/1987 | Peterson ................ H04M 1/15 191/12.2 R |
| 4,896,844 A | * | 1/1990 | Gavagan ................ B60R 22/44 242/378.4 |

FOREIGN PATENT DOCUMENTS

| | | |
|---|---|---|
| CN | 105150996 A | 12/2015 |
| DE | 19915275 A1 | 10/2000 |
| DE | 102012008507 A1 | 10/2013 |
| GB | 1512883 | 6/1978 |
| JP | S54-18531 A | 2/1979 |

\* cited by examiner

THREE-POINT SAFETY BELT AND VEHICLE HAVING SAME

The present application is a 35 U.S.C. §371 National Phase conversion of International (PCT) Patent Application No. PCT/CN2016/085068, filed on Jun. 7, 2016, which claims priority of Chinese Patent Application No. 201510455593.5, filed on Jul. 29, 2015, applied by ZHEJIANG GEELY AUTOMOBILE RES INST CO LTD and GEELY HOLDING GROUP CO LTD, and entitled "THREE-POINT SAFETY BELT AND VEHICLE HAVING SAME". The entire disclosure of the above-identified application is incorporated herein by reference in its entirety. The PCT International Patent Application was filed and published in Chinese.

TECHNICAL FIELD

The present invention relates to vehicle techniques, and more particularly to a three-point safety belt and vehicle having the same.

BACKGROUND

With development of vehicle technology, people's requirements in safety and comfort performance of vehicles has become higher and higher, and how to improve the safety and comfort performance of the vehicles has become one of the objects pursued by major vehicle manufacturers.

Three-point safety belts are common safety devices in vehicles. Nowadays, the safety belts in vehicles are basically three-point safety belts (sometimes the humble two-point safety belts are used in the rear row). The traditional three-point safety belt includes a winder, a belt body, a shoulder belt guide ring, a lock tongue and a buckle. The shoulder belt guide ring is fixed on the vehicle body, the lock tongue is sleeved on the belt body, and the buckle is fixed to one side of the seat. After the lock tongue is inserted into the buckle, the buckling point (i.e., a fixing point of the lock tongue and the buckle) substantially divides the belt body into a shoulder belt which restrains the chest of a passenger and a waist belt which restrains the abdomen of the passenger. An end of the shoulder belt which is remote from the lock tongue passes through the shoulder belt guide ring and is wound around the winder. An end of the waist belt which is remote from the lock tongue is fixed to the vehicle body by an anchor point (i.e., a fixing point of the vehicle body and the end of the waist belt which is remote from the lock tongue). When the lock tongue of the three-point safety belt is inserted into the buckle, the three-point safety belt has four fixing points which includes the anchor point, the buckling point, the D-ring point (i.e., a contact point of the shoulder belt and the shoulder belt guide ring) and the winder point (i.e., a connection point of the winder and the end of the waist belt which is remote from the lock tongue).

In order for convenience of wearing, the lock tongue is generally fixed to an upper portion (i.e., a position close to the shoulder belt guide ring) of the belt body through a lock tongue guide ring when the three-point safety belt is not worn. Therefore, when the lock tongue of the safety belt is pulled toward the buckle, the hand needs to be raised to a higher position to pull the belt body downwardly from top by the lock tongue. During the process of pulling the belt body by the lock tongue, the lock tongue will slide relative to the safety belt, which makes the lock tongue function as a movable pulley in a movable pulley system. However, pulling the movable pulley is a laborious process, and the fact that the belt body slides relative to the lock tongue increases the pulling resistance and energy consumption, which causes the process of wearing the safety belt to be a time-consuming, laborious and poor operation comfort process.

When the three-point safety belt is worn, the belt body of the winder first exerts a force on the shoulder belt, and then transfers the force to the waist belt through the lock tongue guide ring. Since the belt body of the safety belt has a greater friction at the lock tongue guide ring (especially when confronts collision), the effect on the waist belt will be delayed and weakened. When the vehicle confronts collision, the winder exerts a small preload and a low pre-tension speed on the belt body, which greatly affects the safety performance of the vehicle.

In addition, the anchor point (i.e., the fixing point of the vehicle body and the end of the waist belt which is remote from the lock tongue) of the current safety belt is fixed to the sill, which adds additional cost in design, manufacture and assembly.

SUMMARY

Accordingly, the present invention provides a three-point safety belt and a vehicle having the same, which is capable of improving comfort and safety performance of the three-point safety belt as well as decreasing the cost.

The present invention provides a three-point safety belt which includes a belt body, a winder, a shoulder belt guide ring and a lock tongue. The winder and the shoulder belt guide ring are fixed to a vehicle body. The winder is located under the shoulder belt guide ring. The lock tongue is disposed on the belt body. The lock tongue divides the belt body into a shoulder belt for restraining the chest of a passenger and a waist belt for restraining the abdomen of the passenger. The shoulder belt passes through the shoulder belt guide ring. A free end of the shoulder belt which is away from the lock tongue and a free end of the waist belt which is away from the lock tongue are both retracted within the winder. The winder synchronously retracts or releases the shoulder belt and the waist belt.

Furthermore, the winder includes a winder housing and a winder shaft. The winder housing is fixed to the vehicle body. The winder shaft is disposed in the winder housing. Both of the free ends of the shoulder belt and the waist belt are wound around the winder shaft.

Furthermore, the free ends of the shoulder belt and the waist belt are wound around the winder shaft after being stacked together.

Furthermore, the winder further includes a belt guide bracket. The belt guide bracket is fixed to the winder housing and located at one side from which the waist belt is drawn out. When the belt body is drawn out or taken up, the belt guide bracket contacts with the waist belt and guides the draw-out or take-up of the waist belt.

Furthermore, the belt guide bracket includes a guide shaft and a belt guide bracket base. The belt guide bracket base is fixed on the winder housing. The guide shaft is fixed on the belt guide bracket base.

Furthermore, a roller is sleeved on the guide shaft.

Furthermore, when the belt body is not stretched, a distance between the lock tongue and the winder is smaller than a distance between the lock tongue and the shoulder belt guide ring.

Furthermore, the lock tongue includes a tongue plate and a lock tongue guide ring. The lock tongue guide ring is sleeved on the belt body. The belt body further includes a lock tongue positioning bump. The lock tongue guide ring is located above the lock tongue positioning bump when it is sleeved on the belt body. The lock tongue is positioned on the belt body at a position above the lock tongue positioning bump.

The present invention further provides a vehicle which includes either one of the three-point safety belt provided by the present invention.

Furthermore, the vehicle includes a seat. The three-point safety belt is disposed at one side of the seat, and a buckle is disposed at the other side of the seat. A fixing position of the winder on the vehicle body is close to a seat cushion of the seat. A fixing position of the shoulder belt guide ring on the vehicle body is close to a top portion of a backrest of the seat.

In the present invention, the free ends of the shoulder belt and the waist belt are wound up on the same winder, realizing the synchronous release and retraction of the shoulder belt and the waist belt. Therefore, the belt body could be pulled by a small force, which improves the comfort of using the three-point safety belt. The synchronous retraction of the shoulder belt and the waist belt makes the effect of the winder on the waist belt can not be delayed or weakened, and makes the three-point safety belt could have a faster pre-tension speed and a larger pre-tension distance, and improves the safety performance of the three-point safety belt. The waist belt is retracted in the winder, eliminating the anchor point in the prior art, which further reduces the cost of design, manufacture and assembly of the three-point safety belt.

DETAILED DESCRIPTION OF PREFERRED EMBODIMENTS

In order to further illustrate the aspects, techniques and effects of the present invention, the embodiments of the present invention will be described thoroughly in conjunction with the accompanying drawings.

Figure 1:
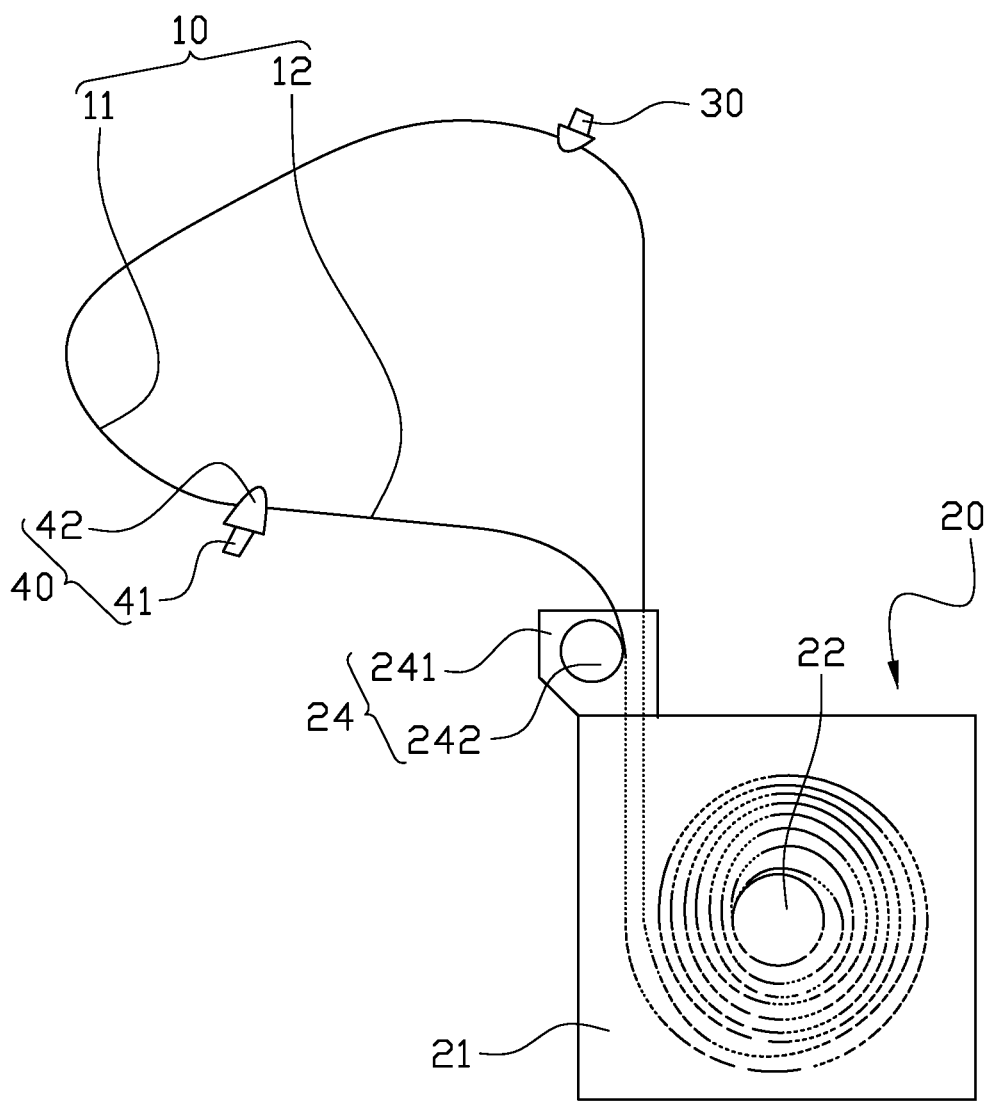
FIG. 1 is a schematic, structural view shown a three-point safety belt of the present invention.
Figure 2:
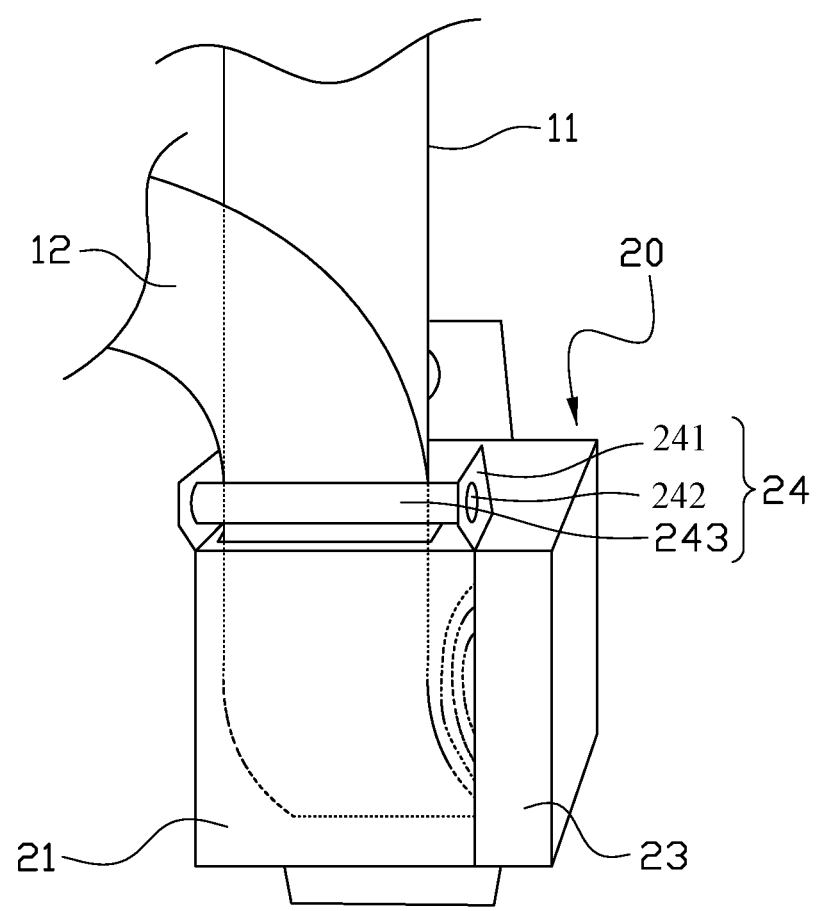
FIG. 2 is a schematic, structural view shown a winder of FIG. 1.
Figure 3:
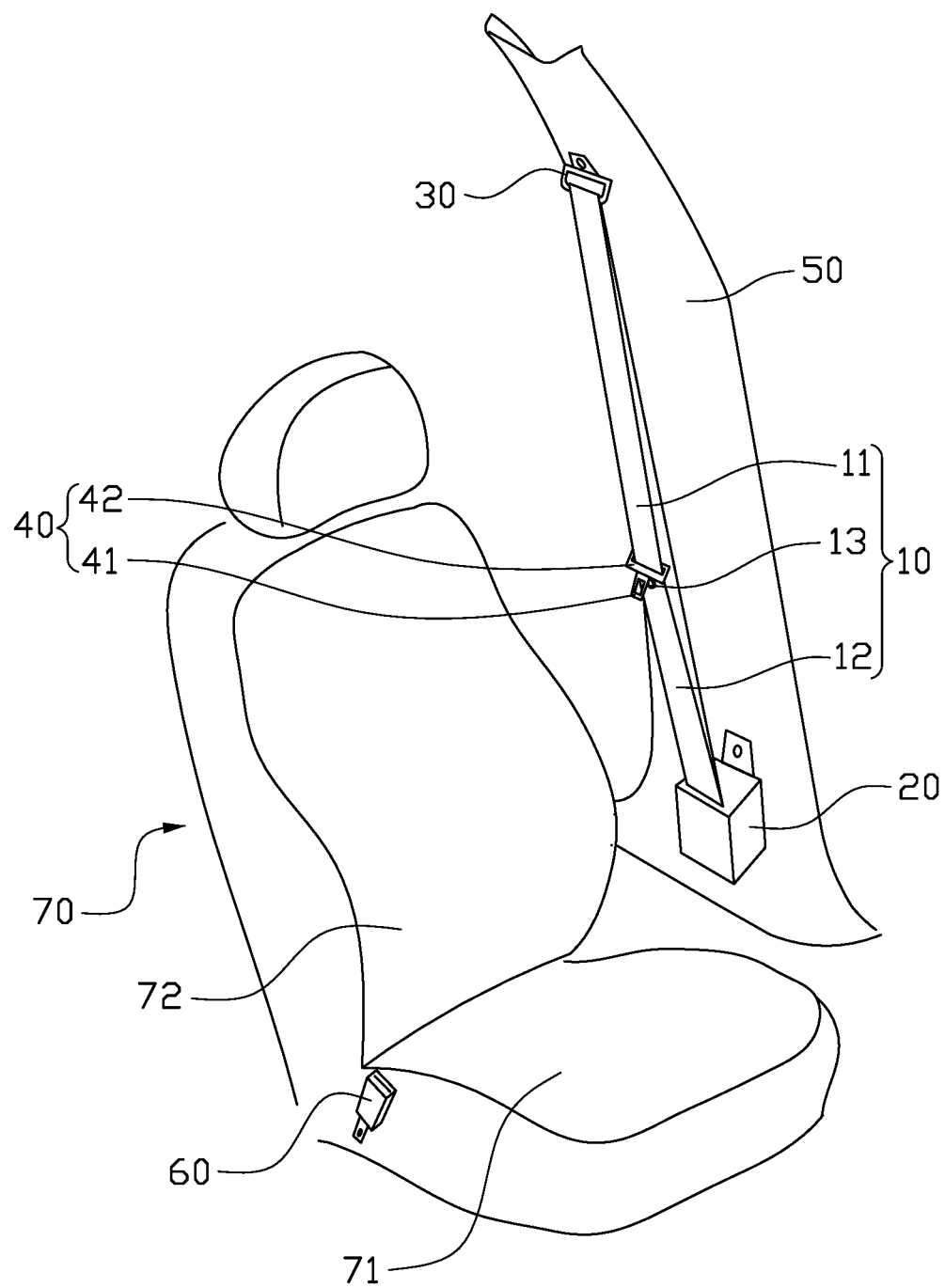
FIG. 3 is a schematic, structural view shown a take-up state of the three-point safety belt of the present invention.
Figure 4:
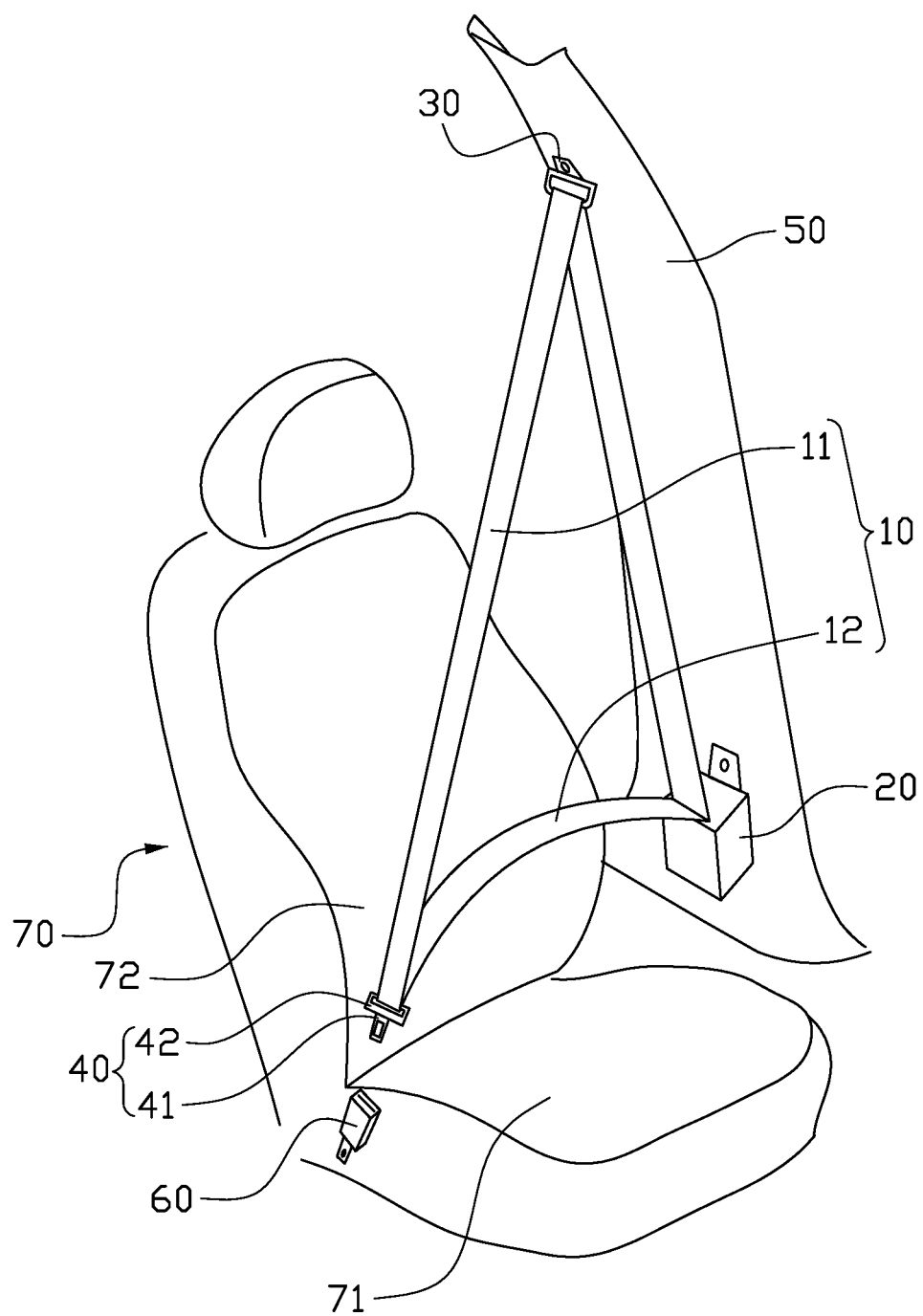
FIG. 4 is a schematic, structural view shown a draw-out state of the three-point safety belt of the present invention.

FIG. 1 is a schematic, structural view shown a three-point safety belt of the present invention, FIG. 2 is a schematic, structural view shown a winder of FIG. 1, FIG. 3 is a schematic, structural view shown a take-up state of the three-point safety belt of the present invention, and FIG. 4 is a schematic, structural view shown a draw-out state of the three-point safety belt of the present invention. Referring to FIG. 1 through FIG. 4, the three-point safety belt of the present invention includes a belt body 10, a winder 20, a shoulder belt guide ring 30 and a lock tongue 40. Taken the front seat as an example, the winder 20 is fixed to B-pillar 50 of a vehicle body and located at a lower portion of the B-pillar 50. The fixing position of the winder 20 is close to a seat cushion 71 of a seat 70 and corresponds to the waist of the passenger. The shoulder belt guide ring 30 is fixed to the B-pillar 50 of the vehicle body and located at an upper portion of the B-pillar 50. The fixing position of the shoulder belt guide ring 30 is close to a top portion of a backrest 72 of the seat 70 and corresponds to shoulders of the passenger, that is to say, on the B-pillar 50, the winder 20 is located under the shoulder belt guide ring 30. The B-pillar 50 is located at one side of the seat 70, and a buckle 60 is disposed at the other side of the seat 70. The lock tongue 40 is sleeved on the belt body 10, and can be buckled with the buckle 60. When the three-point safety belt is worn, the lock tongue 40 divides the belt body 10 into a shoulder belt 11 which is used for restraining the chest of a passenger and a waist belt 12 which is used for restraining the abdomen of the passenger. The shoulder belt 11 passes through the shoulder belt guide ring 30 and is connected with the winder 20. Two opposite ends of the belt body 10, i.e., a free end of the shoulder belt 11 which is away from the lock tongue 40 and a free end of the waist belt 12 which is away from the lock tongue 40 are both retracted within the same winder 20, and the winder 20 synchronously retracts or releases the shoulder belt 11 and waist belt 12.

When the belt body 10 is stretched, due to the winder 20 could release the shoulder belt 11 and the waist belt 12 synchronously, in case that the friction is unconsidered, if the safety belt is fastened, the force of pulling the belt body 10 is only half of that of the traditional three-point safety belts, which improves the operational comfort. When the belt body 10 of the three-point safety belt is pre-tightened or wound, due to the winder 20 could retract the shoulder belt 11 and the waist belt 12 synchronously, the three-point safety belt provided by the present invention could achieve a faster pre-tension speed and a greater pre-tension distance than the prior art, and the effect of the waist belt 12 on the passenger such as reeling, pre-tension and double pre-tension will not be delayed or weakened, which improves the safety performance of the vehicle. Since the shoulder belt 11 and the waist belt 12 are synchronously retracted by only one winder 20, the anchor point of the traditional safety belt is no longer needed, which reduces the cost of design, manufacture and assembly.

More concretely, referring to FIG. 1 and FIG. 2, the winder 20 includes a winder housing 21, a winder shaft 22 and a winding function box 23. One side of the winder housing 21 is fixed to the B-pillar 50 of the vehicle body. The winder shaft 22 is disposed in the winder housing 21, and the free ends of the shoulder belt 11 and the waist belt 12 are wound around the same winder shaft 22. In this embodiment, the free ends of the shoulder belt 11 and the waist belt 12 are wound around the winder shaft 22 after being stacked together. The winding function box 23 is disposed on the winder housing 21. The winding function box 23 is used for accommodating various types of functional mechanisms of the winder 20, such as a coil spring, a car-lock, a belt-lock, a pre-tensioner and electric pre-tensioner and so on.

Furthermore, in order to reduce the friction between the waist belt 12 and the winder housing 21, and provide a safety protection for the waist belt 12, the winder 20 further includes a belt guide bracket 24. The belt guide bracket 24 is fixed to the winder housing 21 and located at one side from which the waist belt 12 is drawn out. When the belt body 10 is drawn out or taken up, the belt guide bracket 24 contacts with the waist belt 12 and guides the draw-out or take-up of the waist belt 12 so that the waist belt 12 could be drawn out or taken up freely. More concretely, the belt guide bracket 24 includes a belt guide bracket base 241 and a guide shaft 242. The belt guide bracket base 241 is fixed on the winder housing 21. The guide shaft 242 is fixed on the belt guide bracket base 241. When the belt body 10 is pulled out or retracted, the waist belt 12 slides on the guide shaft 242. In order to further reduce the friction between the waist belt 12 and the winder housing 21, a roller 243 may be sleeved on the guide shaft 242. When the belt body 10 is pulled out or retracted, the waist belt 12 contacts with the roller 243, and drives the roller 243 to rotate around the guide shaft 242.

Referring to FIG. 3 and FIG. 4, when the three-point safety belt is not worn, i.e., when the belt body 10 is not pulled out and stays in the natural position, a distance between the lock tongue 40 and the winder 20 is smaller than a distance between the lock tongue 40 and the shoulder belt guide ring 30. As compared with the prior art, the lock tongue 40 has a lower position on the belt body 10, and is closer to the lower portion of the belt body 10. When the safety belt is fastened, it is convenient for the passenger to grasp the lock tongue 40 and pull the belt body 10.

Furthermore, the lock tongue 40 includes a tongue plate 41 and a lock tongue guide ring 42. The tongue plate 41 is fixed on the lock tongue guide ring 42. The lock tongue 40 is sleeved on the belt body 10 through the lock tongue guide ring 42. The belt body 10 further includes a lock tongue positioning bump 13 (shown in FIG. 3). When the lock tongue guide ring 42 is sleeved on the belt body 10, the lock tongue guide ring 42 is located above the lock tongue positioning bump 13, preventing the lock tongue 40 from sliding downwardly along the belt body 10, so that the lock tongue 40 is positioned on the belt body 10 at a position above the lock tongue positioning bump 13.

When the three-point safety belt is worn, since the lock tongue 40 is located lower on the belt body 10 and closer to the lower portion of the belt body 10 than the prior art, it is only needed to pull the belt body 10 by the lock tongue 40 from the B-pillar 50 toward a central portion of the vehicle body, and insert the lock tongue 40 into the buckle 60 so that the three-point safety belt is worn without pulling the lock tongue 40 downwardly from top. Since the waist belt 12 and the shoulder belt 11 can be released from the winder 20 synchronously, when the belt body 10 is stretched, the lock tongue 40 does not need to slide with respect to the belt body 10 or only needs to slide a small distance to satisfy requirement of wearing the safety belt. Therefore, when wearing the three-point safety belt, the friction between the lock tongue 40 and the belt body 10 and the energy consumption are both small.

In summary, in the present invention, the free ends of the shoulder belt 11 and the waist belt 12 are wound up on the same winder 20, realizing the synchronous release and retraction of the shoulder belt 11 and the waist belt 12. Therefore, the belt body 10 could be pulled by a small force, which improves the comfort of using the three-point safety belt. The synchronous retraction of the shoulder belt 11 and the waist belt 12 makes the effect of the winder 20 on the waist belt 12 can not be delayed or weakened, and makes the three-point safety belt could have a faster pre-tension speed and a larger pre-tension distance, and improves the safety performance of the three-point safety belt. The waist belt 12 is retracted in winder 20, eliminating the anchor point in the prior art, which further reduces the cost of design, manufacture and assembly of the three-point safety belt.

The present invention also provides a vehicle which includes the three-point safety belt as described above.

The descriptions above are embodiments of the present invention only, and are not used, by any way, to limit the present invention. Although the present invention has been described with reference to the above embodiments, those embodiments are not used to limit the present invention, it will be apparent to anyone of ordinary skill in the art that slight changes or modifications to the described embodiments may be made to become equivalent embodiments without departing from the technique scope of the present invention. On the contrary, any slight and simple changes, equivalent variations and modifications according to the disclosure of the present invention should fall within the technique scope of the present invention.

INDUSTRIAL APPLICABILITY

In embodiments of the present invention, the free ends of the shoulder belt and the waist belt are wound up on the same winder, realizing the synchronous release and retraction of the shoulder belt and the waist belt. Therefore, the belt body could be pulled by a small force, which improves the comfort of using the three-point safety belt. The synchronous retraction of the shoulder belt and the waist belt makes the effect of the winder on the waist belt can not be delayed or weakened, and makes the three-point safety belt could have a faster pre-tension speed and a larger pre-tension distance, and improves the safety performance of the three-point safety belt. The waist belt is retracted in the winder, eliminating the anchor point in the prior art, which further reduces the cost of design, manufacture and assembly of the three-point safety belt.

What is claimed is:

1. A three-point safety belt, comprising a belt body, a winder, a shoulder belt guide ring and a lock tongue, the winder and the shoulder belt guide ring being fixed to a vehicle body, the winder being located under the shoulder belt guide ring, the lock tongue being disposed on the belt body, the lock tongue dividing the belt body into a shoulder belt for restraining the chest of the passenger and a waist belt for restraining the abdomen of the passenger, the shoulder belt passing through the shoulder belt guide ring, wherein a free end of the shoulder belt which is away from the lock tongue and a free end of the waist belt which is away from the lock tongue are both retracted within the same winder, and the winder synchronously retracts or releases the shoulder belt and the waist belt, the winder comprises a winder housing and a belt guide bracket, the winder housing is fixed to the vehicle body, and the winder housing has an opening from which the shoulder belt and the waist belt are drawn out, the belt guide bracket is fixed to the winder housing and next to the opening, when the belt body is drawn out or taken up, the belt guide bracket contacts with the waist belt and guides the draw-out or take-up of the waist belt.

2. The three-point safety belt of claim 1, wherein the winder comprises a winder shaft, the winder shaft is disposed in the winder housing, both of the free ends of the shoulder belt and the waist belt are wound around the winder shaft.

3. The three-point safety belt of claim 2, wherein the free ends of the shoulder belt and the waist belt are wound around the winder shaft after being stacked together.

4. The three-point safety belt of claim 1, wherein the belt guide bracket comprises a guide shaft and a belt guide bracket base, the belt guide bracket base is fixed on the winder housing, the guide shaft is fixed on the belt guide bracket base.

5. The three-point safety belt of claim 4, wherein a roller is sleeved on the guide shaft.

6. The three-point safety belt of claim 1, wherein when the belt body is not stretched, a distance between the lock tongue and the winder is smaller than a distance between the lock tongue and the shoulder belt guide ring.

7. The three-point safety belt of claim 6, wherein the lock tongue comprises a tongue plate and a lock tongue guide ring, the lock tongue guide ring is sleeved on the belt body, the belt body further comprises a lock tongue positioning bump, the lock tongue guide ring is located above the lock tongue positioning bump when it is sleeved on the belt body, the lock tongue is positioned on the belt body at a position above the lock tongue positioning bump.

8. A vehicle, comprising the three-point safety belt of claim 1.

9. The vehicle of claim 8, wherein the vehicle comprises a seat, the three-point safety belt is disposed at one side of the seat, a buckle is disposed at the other side of the seat, a fixing position of the winder on the vehicle body is close to a seat cushion of the seat, a fixing position of the shoulder belt guide ring on the vehicle body is close to a top portion of a backrest of the seat.

10. The three-point safety belt of claim 1, wherein the opening and the belt guide bracket are located on a top end of the winder housing.

11. The three-point safety belt of claim 10, wherein the belt guide bracket is located at a remote side of the opening which is away from the vehicle body.

* * * * *